United States Patent
Itoigawa et al.

(12) United States Patent (10) Patent No.: US 10,574,167 B2
(45) Date of Patent: Feb. 25, 2020

(54) LOAD CONTROL SYSTEM

(71) Applicant: FUJI ELECTRIC CO., LTD., Kawasaki-shi, Kanagawa (JP)

(72) Inventors: Nobuo Itoigawa, Suzuka (JP); Koichi Tanaka, Plymouth, MN (US)

(73) Assignee: FUJI ELECTRIC CO., LTD., Kawasaki-Shi, Kanagawa (JP)

(*) Notice: Subject to any disclaimer, the term of this patent is extended or adjusted under 35 U.S.C. 154(b) by 431 days.

(21) Appl. No.: 15/442,047

(22) Filed: Feb. 24, 2017

(65) Prior Publication Data

US 2018/0248505 A1    Aug. 30, 2018

(51) Int. Cl.
| | |
|---|---|
| *H05B 37/02* | (2006.01) |
| *H02P 27/08* | (2006.01) |
| *G06F 21/44* | (2013.01) |
| *H02P 23/00* | (2016.01) |
| *H02P 27/06* | (2006.01) |
| *G05B 15/02* | (2006.01) |

(52) U.S. Cl.
CPC .............. *H02P 27/08* (2013.01); *G05B 15/02* (2013.01); *G06F 21/44* (2013.01); *G06F 21/445* (2013.01); *H02P 23/0077* (2013.01); *H02P 27/06* (2013.01)

(58) Field of Classification Search
CPC ....... G05B 15/02; G06F 21/44; G06F 21/445; H02P 23/0077; H02P 27/06; H02P 27/08
See application file for complete search history.

(56) References Cited

FOREIGN PATENT DOCUMENTS

| JP | 5877312 B2 | | 3/2016 |
|---|---|---|---|
| JP | 2013149123 | * | 3/2016 |

\* cited by examiner

*Primary Examiner* — Muhammad S Islam
(74) *Attorney, Agent, or Firm* — Manabu Kanesaka (57) ABSTRACT

In this load control system, when linkage security authentication based on hardware and software by linkage between at least a controller and a power converter has been established, a function that enables the power converter to be used for a predetermined purpose is generated by the software.

15 Claims, 4 Drawing Sheets

LOAD CONTROL SYSTEM

BACKGROUND OF THE INVENTION

Field of the Invention

The present invention relates to a load control system, and more particularly, it relates to a load control system including a controller.

Description of the Background Art

A load control system including a controller is known in general. Such a load control system is disclosed in Japanese Patent No. 5877312.

Japanese Patent No. 5877312 discloses a motor control system including a motor controller. In this motor control system, a parameter (a position loop gain, a speed loop gain, or the like) for controlling a motor is stored in advance at the time of factory shipment of the motor controller. Furthermore, at the time of factory shipment, access to the motor controller (reading of the parameter, setting of the parameter, etc.) is prohibited.

To allow access to the motor controller, the parameter for controlling the motor is first transmitted from an external device to the motor controller. Then, access to the motor controller is allowed when it has been confirmed in the motor controller that the parameter stored in the motor controller is identical to the parameter transmitted from the external device. In other words, the parameter stored at the time of factory shipment of the motor controller is a password for allowing access to the motor controller. The parameter is set individually for the motor controller (vary from one motor controller to another), and hence even when the password leaks, a plurality of motor controllers cannot be accessed unlike the case where the plurality of motor controllers can be accessed with one password.

Although the parameter, which serves as the password, is set individually for the motor controller in the motor control system according to Japanese Patent No. 5877312, the motor controller that corresponds to the password can be accessed when the password leaks. Thus, there is such a disadvantage that functions (unique circuit functions of the apparatuses, for example) contained in the motor controller and an apparatus controlled by the motor controller leak, for example. In other words, there is such a problem that when a password for one of a plurality of apparatuses leaks, the function of another apparatus cannot be kept confidential.

SUMMARY OF THE INVENTION

The present invention has been proposed in order to solve the aforementioned problem, and an object of the present invention is to provide a load control system capable of enhancing the confidentiality of a function.

In order to attain the aforementioned object, a load control system according to an aspect of the present invention includes a controller, a power converter controlled by the controller, and a load to which electric power is supplied from the power converter. When linkage security authentication based on at least one of hardware and software by linkage between at least the controller and the power converter of the controller, the power converter, and the load has been established, a function that enables the power converter to be used for a predetermined purpose is generated by the software in the power converter.

In the load control system according to this aspect of the present invention, as hereinabove described, when the linkage security authentication based on at least one of the hardware and the software by the linkage between at least the controller and the power converter of the controller, the power converter, and the load has been established, the function that enables the power converter to be used for the predetermined purpose is generated by the software in the power converter. Thus, when the linkage security authentication has not been established, the function that enables the power converter to be used for the predetermined purpose is not generated in the power converter. Consequently, even if the inside of the power converter is analyzed, for example, the function that enables the power converter to be used for the predetermined purpose is not generated in the first place, and hence this function does not leak. In other words, the confidentiality of the function that enables the power converter to be used for the predetermined purpose is retained by the linkage between a plurality of apparatuses of at least the controller and the power converter, and hence even if a password or the like for one of the plurality of apparatuses leaks, the confidentiality of the function is retained. Thus, the confidentiality of the function can be enhanced.

Furthermore, it is necessary to establish the linkage security authentication by the linkage between at least the controller and the power converter, and hence the linkage security authentication is not established when the power converter alone is extracted from the load control system or when the power converter alone is extracted from the load control system and is combined with another load that cannot be authenticated. More specifically, also in these cases, the function is not generated, and hence the function does not leak. When the security authentication has not been established, the function is not generated, and hence the power converter alone cannot be used for the predetermined purpose.

In the aforementioned load control system according to this aspect, when the linkage security authentication has been established, a function that enables the power converter to be used as a frequency converter capable of outputting a first variable frequency or a first variable voltage is preferably generated by the software. According to this structure, the confidentiality of the function that the first variable frequency or the first variable voltage is capable of being output can be retained.

In this case, when the linkage security authentication has not been established, the power converter preferably becomes the frequency converter capable of outputting a second variable frequency or a second variable voltage, different from the frequency converter capable of outputting the first variable frequency or the first variable voltage. According to this structure, when the linkage security authentication has not been established, the power converter can be used as the frequency converter capable of outputting the second variable frequency or the second variable voltage for using the power converter for a purpose other than the power converter capable of outputting the first variable frequency or the first variable voltage.

In the aforementioned load control system according to this aspect, when the linkage security authentication based on both the hardware and the software by the linkage between at least the controller and the power converter of the controller, the power converter, and the load has been established, the function that enables the power converter to be used for the predetermined purpose is preferably generated by the software in the power converter. According to this structure, the linkage security authentication is established based on both the hardware and the software, and hence the confidentiality can be further enhanced as compared with the case where the linkage security authentication is established based on only one of the hardware and the software.

In the aforementioned load control system according to this aspect, when the linkage security authentication based on at least one of the hardware and the software by linkage between the controller, the power converter, and the load has been established, the function that enables the power converter to be used for the predetermined purpose is preferably generated by the software in the power converter. According to this structure, the confidentiality (security level) can be further enhanced as compared with the case where the linkage security authentication is established by the linkage between only the controller and the power converter.

In the aforementioned load control system according to this aspect, the controller and the power converter are preferably connected to each other by a wire that is the hardware, and the linkage security authentication based on the hardware preferably includes authenticating that communication through the wire has been enabled between the controller and the power converter. According to this structure, the linkage security authentication based on the hardware, which is the wire, can be performed.

In this case, a program code that generates the function that enables the power converter to be used for the predetermined purpose is preferably transmitted to the power converter, and the linkage security authentication based on the hardware preferably includes authenticating a function generation enable signal that is output when the communication through the wire has been enabled between the controller and the power converter and enables generation of the function by the program code. According to this structure, when the communication through the wire has not been enabled between the controller and the power converter, the function generation enable signal is not output, and hence the function is not generated. Thus, leakage of the function can be prevented.

The aforementioned load control system that authenticates the function generation enable signal preferably further includes a switch configured by the hardware that is turned on when the function generation enable signal has been authenticated, and the switch is preferably turned on when the function generation enable signal has been authenticated such that a signal is output from a functional block configured by the software through the switch. According to this structure, the linkage security authentication based on linkage between the hardware and the software can be performed.

In the aforementioned load control system according to this aspect, the load preferably contains load identification information unique to the load, the load identification information is preferably stored in the controller and the power converter, the controller preferably transmits the stored load identification information to the power converter, and the linkage security authentication based on the software preferably includes authenticating that the load identification information stored in the power converter is identical to the load identification information transmitted from the controller. According to this structure, when the load contained in advance in the load control system is replaced by another load, the load identification information of the load contained in advance in the load control system differs from the load identification information of the load by which the load contained in advance in the load control system is replaced. Thus, the linkage security authentication is not established when the load is replaced, and hence generation of the function (fulfillment of the function) in a state where the load is replaced can be prevented.

In the aforementioned load control system according to this aspect, the controller preferably transmits, to the power converter, a program code that generates the function that enables the power converter to be used for the predetermined purpose, and the linkage security authentication based on the software preferably includes authenticating the program code transmitted from the controller based on a predetermined set of conditions. According to this structure, when the controller contained in advance in the load control system is replaced by another controller, the program code transmitted from another controller does not satisfy the predetermined set of conditions, and hence the linkage security authentication is not established. Thus, generation of the function (fulfillment of the function) in a state where the controller is replaced can be prevented.

In the aforementioned load control system according to this aspect, at least one of the controller, the power converter, and the load preferably has unique security authentication unique thereto, and when the unique security authentication unique to at least one of the controller, the power converter, and the load has been established and the linkage security authentication has been established, the function that enables the power converter to be used for the predetermined purpose is preferably generated by the software in the power converter. According to this structure, in addition to the linkage security authentication, the unique security authentication is required, and hence the confidentiality can be further enhanced.

In this case, the unique security authentication unique to the controller preferably includes controller security authentication for activating the controller. According to this structure, it is necessary to establish the controller security authentication of the controller in addition to the linkage security authentication, and hence the confidentiality can be further enhanced.

In the aforementioned load control system having the unique security authentication, the load preferably contains load identification information unique to the load, and the unique security authentication of the load preferably includes load security authentication in which the load identification information is acquired from the load with a personal identification number. According to this structure, it is necessary to establish the load security authentication in addition to the linkage security authentication, and hence the confidentiality can be further enhanced.

According to the present invention, as hereinabove described, the confidentiality of the function can be enhanced.

DESCRIPTION OF THE PREFERRED EMBODIMENTS

An embodiment of the present invention is hereinafter described with reference to the drawings.

The structure of a motor control system 100 according to this first embodiment is now described with reference to FIGS. 1 to 4. The motor control system 100 is an example of a "load control system" in the claims.

<Structure of Motor Control System>

Figure 1:
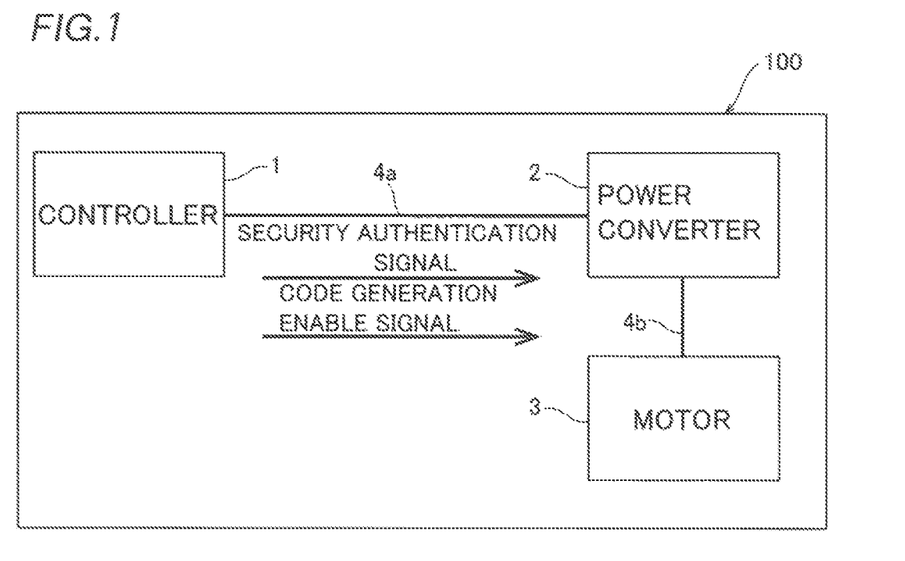
FIG. 1 is a block diagram of a motor control system according to an embodiment of the present invention.

As shown in FIG. 1, the motor control system 100 includes a controller 1 such as an upper level controller, a power converter 2 controlled by a command from the controller 1, and a motor 3 to which electric power is supplied from the power converter 2. The motor 3 is an example of a "load" in the claims. The motor control system 100 is applied to a carrier machine, a processing machine, or an air-conditioning machine, for example.

The controller 1 and the power converter 2 are connected to each other by a dedicated cable 4a. Communication through the cable 4a between the controller 1 and the power converter 2 is performed based on dedicated protocols. In other words, the communication between the controller 1 and the power converter 2 cannot be performed when the controller 1 or the power converter 2 is replaced by a controller 1 or a power converter 2 not based on (not having) the dedicated protocols. The communication through the cable 4a is analog communication or digital communication. The cable 4a is an example of a "wire" in the claims.

The power converter 2 and the motor 3 are connected to each other by a cable 4b. The cable 4b is a common wire. Communication between the power converter 2 and the motor 3 is not performed based on dedicated protocols.

<Structure of Controller>

Figure 2:
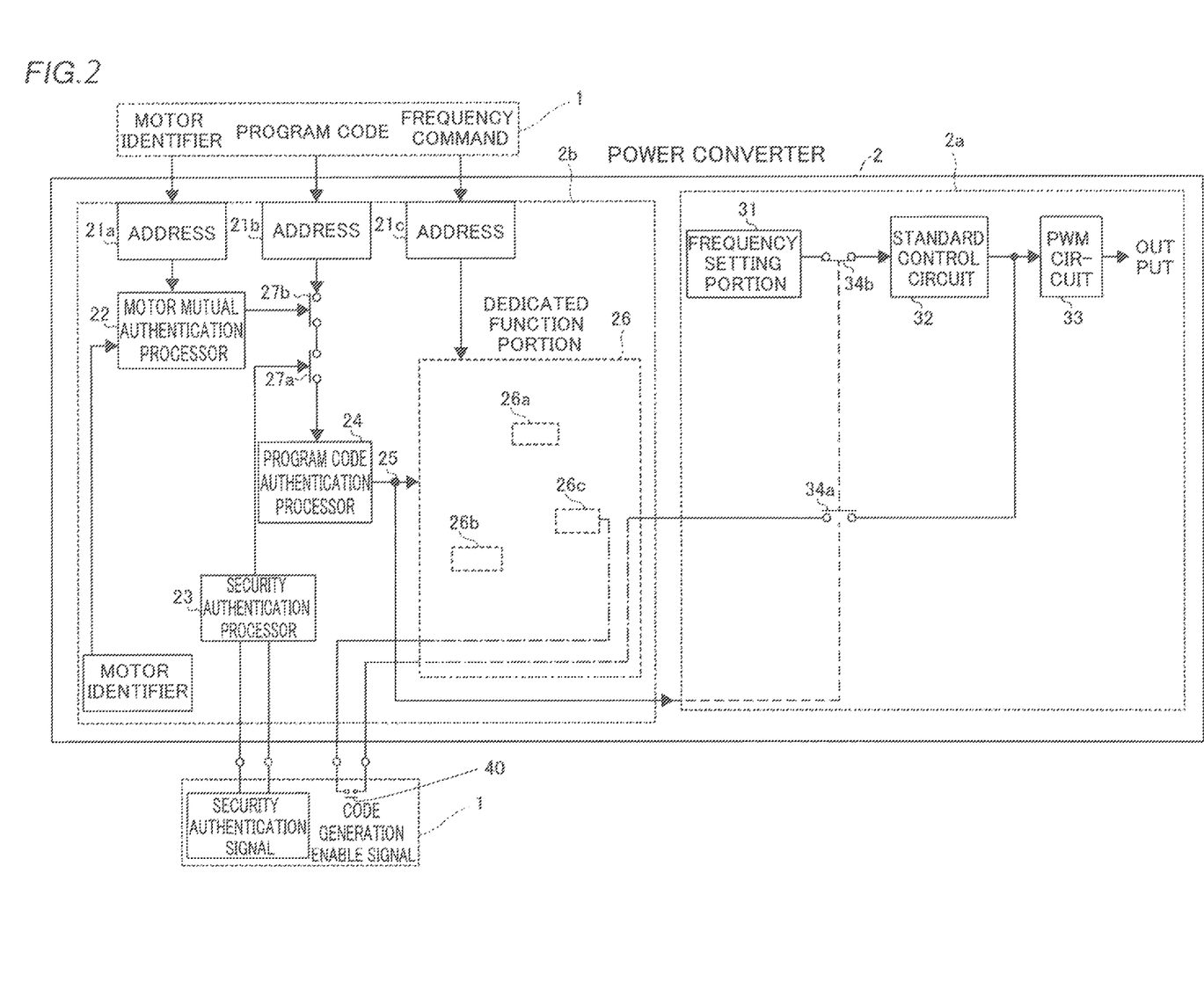
FIG. 2 is a block diagram (a diagram showing functional blocks) of a power converter according to the embodiment of the present invention.

The structure of the controller 1 is now described with reference to FIG. 2. In FIG. 2, two controllers 1 are illustrated for convenience, but one controller 1 is actually provided.

As shown in FIG. 2, in the controller 1, a motor identifier of the motor 3 is set (stored) in a dedicated code, and the stored motor identifier is transmitted to the power converter 2. The motor identifier is a code unique to each motor 3. The motor 3 can be identified by the motor identifier. The motor identifier is an example of "load identification information" in the claims. The controller 1 transmits, to the power converter 2, a program code that generates a function that enables the power converter 2 to be used for a predetermined purpose.

The controller 1 also transmits a frequency command to the power converter 2. The motor identifier, the program code, and the frequency command are transmitted to the power converter 2 through the cable 4a. The motor identifier, the program code, and the frequency command are transmitted to an address 21a, an address 21b, and an address 21c, which are addresses limited to the controller 1, based on the dedicated protocols, respectively. The frequency command is a command for outputting a desired frequency or a desired voltage from the power converter 2.

The controller 1 transmits a security authentication signal and a code generation enable signal to the power converter 2. The security authentication signal and the code generation enable signal are described in detail later.

According to this embodiment, the controller 1 has unique security authentication. Specifically, the controller 1 performs controller security authentication for activating the controller 1. The controller security authentication is to enable the controller 1 to install software by starting a release program, for example. The controller security authentication is also to enable activation of the software by input of a key or the like including a plurality of digits and being unique to each controller 1. The controller security authentication is also to perform advanced setting of the type of apparatus, change of various passcodes, and management of the passcodes by input of a setting passcode of the controller 1. The controller security authentication is an example of "unique security authentication" in the claims.

<Structure of Power Converter>

The structure of the power converter 2 is now described with reference to FIG. 2. A motor mutual authentication processor 22, a security authentication processor 23, a program code authentication processor 24, a code authentication portion 25, and a dedicated function portion 26, all of which are described below, are functional blocks configured by the software. These functional blocks are provided in a control portion (not shown) of the power converter 2.

As shown in FIG. 2, the power converter 2 includes a standard function region 2a and a dedicated function region 2b. The standard function region 2a is provided with a frequency setting portion 31, a standard control circuit 32, and a PWM circuit 33. A desired frequency is set by the frequency setting portion 31, and a command value of the set frequency is input into the standard control circuit 32. Then, the PWM circuit 33 operates such that the voltage of the frequency based on this command value is output from the power converter 2 to the motor 3.

The dedicated function region 2b is provided with the motor mutual authentication processor 22. A motor identifier is input from the controller 1 into the motor mutual authentication processor 22. According to this embodiment, the motor mutual authentication processor 22 authenticates (checks) that the motor identifier stored in the power converter 2 is identical to the motor identifier transmitted from the controller 1. In other words, the motor mutual authentication processor 22 performs linkage security authentication based on the software by linkage between the controller 1, the power converter 2, and the motor 3.

The dedicated function region 2b is provided with the security authentication processor 23. The security authentication signal is transmitted from the controller 1 to the security authentication processor 23. The security authentication signal is for linkage security authentication based on hardware (cable 4a). Specifically, the security authentication signal is for authenticating that the communication through the cable 4a has been enabled between the controller 1 and the power converter 2. In other words, the security authentication signal is a signal to be transmitted from the controller 1 when the controller 1 and the power converter 2 are connected to each other by the dedicated cable 4a to enable communication based on the dedicated protocols. When a voltage applied to the dedicated cable 4a reaches a predetermined voltage, for example, the security authentication signal is transmitted.

The dedicated function region 2b is provided with the program code authentication processor 24. The program code authentication processor 24 authenticates the program code that is transmitted from the controller 1 and generates the function that enables the power converter 2 to be used for the predetermined purpose. Specifically, according to this embodiment, the program code authentication processor 24 authenticates (performs the linkage security authentication based on the software) the program code transmitted from the controller 1 based on a predetermined set of conditions.

The function that enables the power converter 2 to be used for the predetermined purpose is achieved (generated) by causing a plurality of functional blocks 26a, 26b, and 26c provided in advance in the dedicated function portion 26 to function according to a predetermined order, for example. This predetermined order is stored (memorized) in advance in the power converter 2. The program code transmitted from the controller 1 contains this predetermined order. The program code authentication processor 24 authenticates (checks) whether or not the predetermined order stored in advance in the power converter 2 is identical to the predetermined order contained in the program code transmitted from the controller 1.

The dedicated function region 2b is provided with the code authentication portion 25. The code generation enable signal is input into the code authentication portion 25. The code generation enable signal is output when the communication through the cable 4a has been enabled between the controller 1 and the power converter 2. According to this embodiment, the code authentication portion 25 authenticates (performs the linkage security authentication based on the cable 4a, which is hardware) the input code generation enable signal. The code generation enable signal is an example of a "function generation enable signal" in the claims.

According to this embodiment, a switch 40 configured by hardware and turned on when the code generation enable signal has been authenticated is provided. The switch 40 is turned on when the code generation enable signal has been authenticated, whereby a signal is output from the functional block configured by the software through the switch 40. For example, when the code generation enable signal has been authenticated, the functional block 26c and the switch 40 are connected to each other (see one-dot chain lines inside the dedicated function portion 26) such that the signal is output from the functional block 26c to the outside of the dedicated function portion 26 through the switch 40.

The dedicated function region 2b is provided with the dedicated function portion 26. In the dedicated function portion 26 (power converter 2), the function that enables the power converter 2 to be used for the predetermined purpose is generated by the software when the linkage security authentication has been established. In other words, when the linkage security authentication has been established, the plurality of functional blocks 26a, 26b, and 26c provided in advance in the dedicated function portion 26 are caused to function according to the predetermined order, as described above.

The power converter 2 is provided with a function code (not shown). The function code is a code for changing the function of the power converter 2 by change of setting of the power converter 2, for example. Only an administrator or the like knows the function code, and a third party does not know the function code. To authenticate the function code (to make change of the setting with the function code) is an example of "unique security authentication" in the claims.

<Structure of Motor>

The structure of the motor 3 is now described with reference to FIG. 3.

Figure 3:
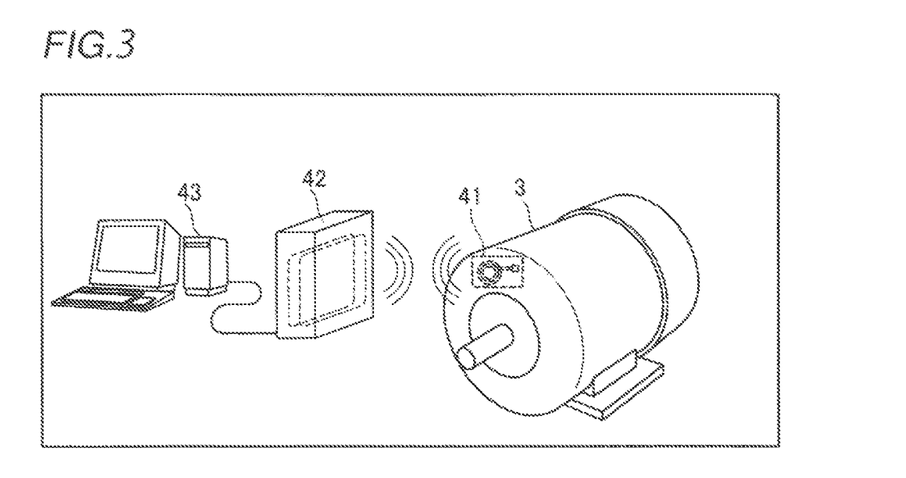
FIG. 3 is a diagram for illustrating motor security authentication according to the embodiment of the present invention.

As shown in FIG. 3, the motor 3 contains the motor identifier unique to the motor 3. The motor identifier is memorized in an IC chip 41 or the like provided in the motor 3, for example.

According to this embodiment, the motor 3 performs motor security authentication unique to the motor 3. A reader 42 reads the motor identifier from the motor 3 provided with the IC chip 41, for example. A PIN (Personal Identification Number) is needed to read the motor identifier from the IC chip 41. Only the administrator or the like knows the PIN, and the third party does not know the PIN. The read motor identifier is input into a management system 43, and is set (stored) in dedicated codes of the controller 1 and the power converter 2. The motor security authentication is an example of "unique security authentication" or "load security authentication" in the claims.

According to this embodiment, when linkage security authentication based on at least one of the hardware and the software (specifically, both the hardware and the software) by linkage between at least the controller 1 and the power converter 2 (specifically, three of the controller 1, the power converter 2, and the motor 3) of the controller 1, the power converter 2, and the motor 3 has been established, the function that enables the power converter 2 to be used for the predetermined purpose is generated by the software in the power converter 2. The linkage security authentication is now described below.

<Linkage Security Authentication>

The linkage security authentication is now described with reference to FIG. 4. The following processing for the linkage security authentication is mainly performed by the control portion (not shown) of the power converter 2. Assume that the controller security authentication of the controller 1, authentication of the function code of the power converter 2, and the motor security authentication of the motor 3 have been performed in advance.

Figure 4:
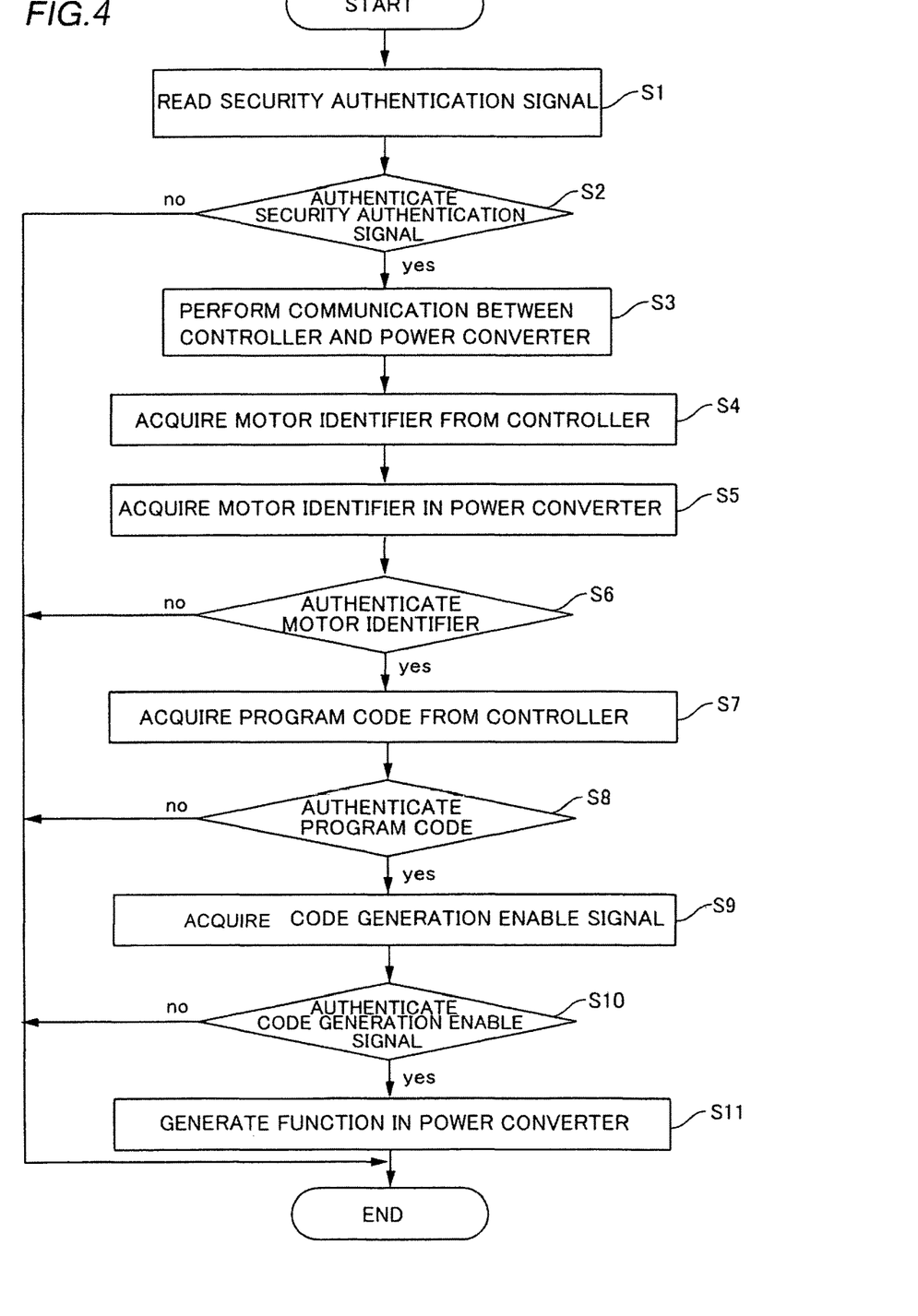
FIG. 4 is a flowchart for illustrating linkage security authentication of the motor control system according to the embodiment of the present invention.

As shown in FIG. 4, the security authentication signal transmitted from the controller 1 is read at a step S1.

Then, the security authentication processor 23 authenticates the security authentication signal at a step S2. In other words, the security authentication signal transmitted from the controller 1 is authenticated when the communication through the cable 4a between the controller 1 and the power converter 2 is enabled. Thus, a switch 27a (see FIG. 2) is turned on. The switch 27a is not a mechanical switch but a software switch. When the security authentication processor 23 does not authenticate the security authentication signal, the processing for the linkage security authentication is terminated. The authentication at the step S2 is the authentication based on the hardware (cable 4a).

Then, the communication through the cable 4a between the controller 1 and the power converter 2 is performed (started) at a step S3.

Then, the motor identifier is acquired (received) from the controller 1 through the cable 4a at a step S4. The motor identifier is acquired by the motor mutual authentication processor 22.

Then, the motor identifier set (stored) in the dedicated code of the power converter 2 is acquired by the motor mutual authentication processor 22 at a step S5.

Then, the motor mutual authentication processor 22 determines (authenticates) whether or not the motor identifier stored in the power converter 2 is identical to the motor identifier transmitted from the controller 1 at a step S6. When the motor identifier stored in the power converter 2 is identical to the motor identifier transmitted from the controller 1, a software switch 27b (see FIG. 2) is turned on, and the control portion advances to a step S7. When the motor identifier stored in the power converter 2 is not identical to the motor identifier transmitted from the controller 1, the processing for the linkage security authentication is terminated. The authentication at the step S6 is the linkage security authentication based on the software (motor mutual authentication processor 22).

Then, the program code is acquired (received) from the controller 1 through the cable 4a at the step S7. The program code is acquired by the program code authentication processor 24.

Then, the program code authentication processor 24 authenticates the program code at a step S8. Specifically, the program code authentication processor 24 authenticates (checks) whether or not the predetermined order stored in advance in the power converter 2 for causing the plurality of functional blocks 26a, 26b, and 26c provided in the dedicated function portion 26 to function according to the predetermined order is identical to the predetermined order contained in the program code transmitted from the controller 1, as described above. When the predetermined order stored in the power converter 2 is identical to the predetermined order contained in the program code transmitted from the controller 1, the control portion advances to a step S9. When the predetermined order stored in the power converter 2 is not identical to the predetermined order contained in the program code transmitted from the controller 1, the processing for the linkage security authentication is terminated. The authentication at the step S8 is the linkage security authentication based on the software (program code authentication processor 24).

Then, the code generation enable signal is acquired (received) from the controller 1 at the step S9. The code generation enable signal is acquired by the code authentication portion 25. The code generation enable signal is a signal that enables generation of the function by the program code.

Then, the code authentication portion 25 authenticates the code generation enable signal at a step S10. The code generation enable signal is output (authenticated) when the communication through the cable 4a has been enabled between the controller 1 and the power converter 2. To authenticate the code generation enable signal is the linkage security authentication based on the hardware (cable 4a). When the code generation enable signal has been authenticated at the step S10, the control portion advances to a step S11, and when the code generation enable signal has not been authenticated, the processing for the linkage security authentication is terminated.

When the code generation enable signal has been authenticated at the step S10, the switch 34a (see FIG. 2) is turned on, and the switch 34b (see FIG. 2) is turned off.

Then, the function that enables the power converter 2 to be used for the predetermined purpose is generated by the software in the dedicated function portion 26 of the power converter 2 at the step S11. To generate the function by the software is "to transmit the program code that generates the function that enables the power converter 2 to be used for the predetermined purpose from the controller 1 to the power converter 2, to authenticate the program code based on the predetermined set of conditions in the power converter 2, and to generate the function that enables the power converter 2 to be used for the predetermined purpose by the software". Specifically, according to this embodiment, a function that enables the power converter 2 to be used as a frequency converter capable of outputting a first variable frequency or a first variable voltage is generated by the software when the linkage security authentication has been established. More specifically, the plurality of functional blocks 26a, 26b, and 26c provided in the dedicated function portion 26 are caused to function according to the predetermined order based on the program code transmitted from the controller 1. Thus, the power converter 2 is enabled to be used as the frequency converter capable of outputting the first variable frequency or the first variable voltage based on the software generated in the dedicated function portion 26 in order for the power converter 2 to be used for the predetermined purpose. Consequently, the standard control circuit 32 and the PWM circuit 33 operate such that the first variable frequency or the first variable voltage is output from the power converter 2.

The generated software is memorized in a volatile memory means such as a RAM, and when power is no longer supplied, memorized information can be no longer retained, and the function that enables the power converter 2 to be used for the predetermined purpose is lost.

According to this embodiment, when the linkage security authentication has not been established at any of the steps S2, S6, S8, and S10, the power converter 2 becomes a frequency converter capable of outputting a second variable frequency or a second variable voltage for using the power converter 2 for a purpose other than the power converter 2 capable of outputting the first variable frequency or the first variable voltage. In other words, the software switch 34a remains off, and the software switch 34b remains on. Thus, the standard control circuit 32 and the PWM circuit 33 operate such that the second variable frequency or the second variable voltage is output from the power converter 2 based on the command value set by the frequency setting portion 31 of the standard function region 2a.

Thus, according to this embodiment, the linkage security authentication (authentication of the motor identifier) by the linkage between the controller 1, the power converter 2, and the motor 3 and the linkage security authentication (the authentication of the security authentication signal, the authentication of the program code, and the authentication of the code generation enable signal) by the linkage between the controller 1 and the power converter 2 are performed. Furthermore, the linkage security authentication based on both the hardware (cable 4a) and the software (security authentication processor 23, motor mutual authentication processor 22, program code authentication processor 24, and code authentication portion 25) is performed.

Furthermore, as described above, the controller security authentication of the controller 1, the authentication of the function code of the power converter 2, and the motor security authentication of the motor 3 are performed in advance, and thereafter the linkage security authentication is performed. In other words, according to this embodiment, when the controller security authentication of the controller 1, the authentication of the function code of the power converter 2, and the motor security authentication of the motor 3 have been established and the linkage security authentication has been established, the function that enables the power converter 2 to be used for the predetermined purpose is generated by the software in the power converter 2.

(Effects of this Embodiment)

According to this embodiment, the following effects can be obtained.

According to this embodiment, as hereinabove described, when the linkage security authentication based on at least one of the hardware and the software by the linkage between at least the controller 1 and the power converter 2 of the controller 1, the power converter 2, and the motor 3 has been established, the function that enables the power converter 2 to be used for the predetermined purpose is generated by the software in the power converter 2. Thus, when the linkage security authentication has not been established, the function that enables the power converter 2 to be used for the predetermined purpose is not generated in the power converter 2. Consequently, even if the inside of the power converter 2 is analyzed, for example, the function that enables the power converter 2 to be used for the predetermined purpose is not generated in the first place, and hence this function does not leak. Thus, the confidentiality of the function can be retained. In other words, the confidentiality of the function that enables the power converter 2 to be used for the predetermined purpose is retained by the linkage between a plurality of apparatuses of at least the controller 1 and the power converter 2, and hence even if a password or the like for one of the plurality of apparatuses leaks, the confidentiality of the function is retained. Thus, the confidentiality of the function can be enhanced.

Furthermore, it is necessary to establish the linkage security authentication by the linkage between at least the controller 1 and the power converter 2, and hence the linkage security authentication is not established when the power converter 2 alone is extracted from the motor control system 100 or when the power converter 2 alone is extracted from the motor control system 100 and is combined with another motor 3 that cannot be authenticated. More specifically, also in these cases, the function is not generated, and hence the function does not leak. When the security authentication has not been established, the function is not generated, and hence the power converter 2 alone cannot be used for the predetermined purpose.

According to this embodiment, as hereinabove described, when the linkage security authentication has been established, the function that enables the power converter 2 to be used as the frequency converter capable of outputting the first variable frequency or the first variable voltage is generated by the software. Thus, the confidentiality of the function that the power converter 2 is a power converter capable of outputting the first variable frequency or the first variable voltage can be retained.

According to this embodiment, as hereinabove described, when the linkage security authentication has not been established, the power converter 2 becomes the frequency converter capable of outputting the second variable frequency or the second variable voltage for using the power converter 2 for a purpose other than the power converter 2 capable of outputting the first variable frequency or the first variable voltage. Thus, when the linkage security authentication has not been established, the power converter 2 can be used as the frequency converter capable of outputting the second variable frequency or the second variable voltage.

According to this embodiment, as hereinabove described, when the linkage security authentication based on both the hardware and the software by the linkage between at least the controller 1 and the power converter 2 of the controller 1, the power converter 2, and the motor 3 has been established, the function that enables the power converter 2 to be used for the predetermined purpose is generated by the software in the power converter 2. Thus, the linkage security authentication is established based on both the hardware and the software, and hence the confidentiality can be further enhanced as compared with the case where the linkage security authentication is established based on only one of the hardware and the software.

According to this embodiment, as hereinabove described, when the linkage security authentication based on at least one of the hardware and the software by the linkage between the controller 1, the power converter 2, and the motor 3 has been established, the function that enables the power converter 2 to be used for the predetermined purpose is generated by the software in the power converter 2. Thus, the confidentiality (security level) can be further enhanced as compared with the case where the linkage security authentication is established by the linkage between only the controller 1 and the power converter 2.

According to this embodiment, as hereinabove described, the controller 1 and the power converter 2 are connected to each other by the cable 4a that is the hardware, and the linkage security authentication based on the hardware includes authenticating that the communication through the cable 4a has been enabled between the controller 1 and the power converter 2. Thus, the linkage security authentication based on the hardware, which is the cable 4a, can be performed.

According to this embodiment, as hereinabove described, the linkage security authentication based on the hardware includes authenticating the code generation enable signal that is output when the communication through the cable 4a has been enabled between the controller 1 and the power converter 2 and enables generation of the function by the program code. Thus, when the communication through the cable 4a has not been enabled between the controller 1 and the power converter 2, the code generation enable signal is not output, and hence the function is not generated. Thus, leakage of the function can be prevented.

According to this embodiment, as hereinabove described, the motor control system 100 includes the switch 40 configured by the hardware that is turned on when the code generation enable signal has been authenticated, and the switch 40 is turned on when the code generation enable signal has been authenticated such that the signal is output from the functional block configured by the software through the switch 40. Thus, the linkage security authentication based on linkage between the hardware and the software can be performed. When the switch 40 is turned off by breaking, drawing, or the like of the cable 4a during operation or non-operation, for example, the function is not established.

According to this embodiment, as hereinabove described, the linkage security authentication based on the software includes authenticating that the motor identifier stored in the power converter 2 is identical to the motor identifier transmitted from the controller 1. Thus, when the motor 3 contained in advance in the motor control system 100 is replaced by another motor 3, the motor identifier of the motor 3 contained in advance in the motor control system 100 differs from the motor identifier of the motor 3 by which the motor 3 contained in advance in the motor control system 100 is replaced. Thus, the linkage security authentication is not established when the motor 3 is replaced, and hence generation of the function (fulfillment of the function) in a state where the motor 3 is replaced can be prevented.

According to this embodiment, as hereinabove described, the linkage security authentication based on the software includes authenticating the program code transmitted from the controller 1 based on the predetermined set of conditions. Thus, when the controller 1 contained in advance in the motor control system 100 is replaced by another controller 1, the program code transmitted from another controller 1 does not satisfy the predetermined set of conditions, and hence the linkage security authentication is not established. Thus, generation of the function (fulfillment of the function) in a state where the controller 1 is replaced can be prevented.

According to this embodiment, as hereinabove described, at least one of the controller 1, the power converter 2, and the motor 3 has the unique security authentication unique thereto, and when the unique security authentication unique to at least one of the controller 1, the power converter 2, and the motor 3 has been established and the linkage security authentication has been established, the function that enables the power converter 2 to be used for the predetermined purpose is generated by the software in the power converter 2. Thus, in addition to the linkage security authentication, the unique security authentication is required, and hence the confidentiality can be further enhanced.

According to this embodiment, as hereinabove described, the unique security authentication unique to the controller 1 includes the controller security authentication for activating the controller 1. Thus, it is necessary to establish the controller security authentication of the controller 1 in addition to the linkage security authentication, and hence the confidentiality can be further enhanced.

According to this embodiment, as hereinabove described, the motor 3 contains the motor identifier unique to the motor 3, and the unique security authentication of the motor 3 includes the motor security authentication in which the motor identifier is acquired from the motor 3 with the PIN. Thus, it is necessary to establish the motor security authentication in addition to the linkage security authentication, and hence the confidentiality can be further enhanced.

[Modification]

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the example of generating the function that enables the power converter to be used as the frequency converter capable of outputting the first variable frequency or the first variable voltage by the software when the linkage security authentication has been established has been shown in the aforementioned embodiment, the present invention is not restricted to this. For example, a function that enables the power converter to be used as an apparatus other than the frequency converter capable of outputting the first variable frequency or the first variable voltage may be generated by the software when the linkage security authentication has been established.

While the example of generating the function by the software when the linkage security authentication based on both the hardware and the software has been established has been shown in the aforementioned embodiment, the present invention is not restricted to this. For example, the function may be generated by the software when the linkage security authentication based on only one of the hardware and the software has been established.

While the example of generating the function by the software when the linkage security authentication by the linkage between three apparatuses of the controller, the power converter, and the motor has been established has been shown in the aforementioned embodiment, the present invention is not restricted to this. For example, the function may be generated by the software when the linkage security authentication by the linkage between two apparatuses of the controller and the power converter has been established.

While the example in which the linkage security authentication based on the hardware is the authentication based on the cable has been shown in the aforementioned embodiment, the present invention is not restricted to this. For example, the linkage security authentication based on hardware other than the cable may be performed.

While the example in which the linkage security authentication based on the software is the authentication by the security authentication processor, the motor mutual authentication processor, the program code authentication processor, and the code authentication portion has been shown in the aforementioned embodiment, the present invention is not restricted to this. For example, the linkage security authentication based on the software may be performed in a portion other than the security authentication processor, the motor mutual authentication processor, the program code authentication processor, and the code authentication portion.

While the example in which all of the controller, the power converter, and the motor have the unique security authentication unique thereto has been shown in the aforementioned embodiment, the present invention is not restricted to this. For example, one or two of the controller, the power converter, and the motor may have the unique security authentication unique thereto. Furthermore, when only the linkage security authentication has been established without using the unique security authentication unique to the controller, the power converter, and the motor, the function may be generated by the software.

While the example in which the unique security authentication unique to the controller is the authentication for activating the controller has been shown in the aforementioned embodiment, the present invention is not restricted to this. For example, the unique security authentication unique to the controller may be authentication for other than activating the controller.

While the example in which the unique security authentication unique to the motor is the authentication in which the motor identifier is acquired from the motor with the PIN has been shown in the aforementioned embodiment, the present invention is not restricted to this. For example, the unique security authentication unique to the motor may be authentication for other than acquiring the motor identifier from the motor with the PIN.

While the example in which the "load identification information" is the motor identifier has been shown in the aforementioned embodiment, the present invention is not restricted to this. For example, a load identifier capable of identifying a load may be used instead of the motor identifier. In this case, an IC chip in which the load identifier is memorized is provided inside a load device to be driven by the motor.

While the example of using the motor as a load to which electric power is supplied from the power converter has been shown in the aforementioned embodiment, the present invention is not restricted to this. For example, electric power may be supplied from the power converter to a load other than the motor.

While the example in which the power converter functions as the frequency converter has been shown in the aforementioned embodiment, the present invention is not restricted to this. For example, the power converter may function as an apparatus other than the frequency converter.

What is claimed is:

1. A load control system comprising:
   a controller;
   a power converter controlled by the controller; and
   a load to which electric power is supplied from the power converter,
   wherein when linkage security authentication based on at least one of hardware and software by linkage between at least the controller and the power converter of the controller, the power converter, and the load has been established, a function that enables the power converter to be used for a predetermined purpose is generated by the software in the power converter, and
   when the linkage security authentication based on at least one of the hardware and the software by the linkage between at least the controller and the power converter of the controller, the power converter, and the load has not been established, a function that does not exist in the power converter is newly generated by the software in the power converter.

2. The load control system according to claim 1, wherein when the linkage security authentication has been established, a function that enables the power converter to be used as a frequency converter capable of outputting a first variable frequency or a first variable voltage is generated by the software.

3. The load control system according to claim 2, wherein when the linkage security authentication has not been established, the power converter becomes a frequency converter capable of outputting a second variable frequency or a second variable voltage, different from the frequency converter capable of outputting the first variable frequency or the first variable voltage.

4. The load control system according to claim 1, wherein when the linkage security authentication based on both the hardware and the software by the linkage between at least the controller and the power converter of the controller, the power converter, and the load has been established, the function that enables the power converter to be used for the predetermined purpose is generated by the software in the power converter.

5. The load control system according to claim 1, wherein when the linkage security authentication based on at least one of the hardware and the software by linkage among the controller, the power converter, and the load has been established, the function that enables the power converter to be used for the predetermined purpose is generated by the software in the power converter.

6. The load control system according to claim 1, wherein the controller and the power converter are connected to each other by a wire that is the hardware, and
the linkage security authentication based on the hardware includes authenticating that communication through the wire has been enabled between the controller and the power converter.

7. The load control system according to claim 6, wherein the controller transmits, to the power converter, a program code that generates the function that enables the power converter to be used for the predetermined purpose, and
the linkage security authentication based on the hardware includes authenticating a function generation enable signal that is output when the communication through the wire has been enabled between the controller and the power converter and enables generation of the function by the program code.

8. The load control system according to claim 7, further comprising a switch configured by the hardware that is turned on when the function generation enable signal has been authenticated,
wherein the switch is turned on when the function generation enable signal has been authenticated such that a signal is output from a functional block configured by the software through the switch.

9. The load control system according to claim 1, wherein the load contains load identification information unique to the load,
the load identification information is stored in the controller and the power converter,
the controller transmits the stored load identification information to the power converter, and
the linkage security authentication based on the software includes authenticating that the load identification information stored in the power converter is identical to the load identification information transmitted from the controller.

10. The load control system according to claim 1, wherein the controller transmits, to the power converter, a program code that generates the function that enables the power converter to be used for the predetermined purpose, and
the linkage security authentication based on the software includes authenticating the program code transmitted from the controller based on a predetermined set of conditions.

11. The load control system according to claim 1, wherein at least one of the controller, the power converter, and the load has unique security authentication unique thereto, and
when the unique security authentication unique to at least one of the controller, the power converter, and the load has been established and the linkage security authentication has been established, the function that enables the power converter to be used for the predetermined purpose is generated by the software in the power converter.

12. The load control system according to claim 11, wherein the unique security authentication unique to the controller includes controller security authentication for activating the controller.

13. The load control system according to claim 11, wherein the load contains load identification information unique to the load, and
the unique security authentication of the load includes load security authentication in which the load identification information is acquired from the load with a personal identification number.

14. The load control system according to claim 1, further comprising a wire connecting the controller and the power converter to communicate therebetween,
wherein the controller is configured to transmit a motor identifier, a security authentication signal, and a program code to the power converter through the wire, and
the power converter includes a motor mutual authentication processor to check the motor identifier transmitted from the controller, a security authentication processor to check the security authentication signal transmitted from the controller, and a program code authentication processor to check the program code transmitted from the controller; and
when the motor mutual authentication processor authenticates the motor identifier, the linkage security authentication based on the software by linkage among the controller, the power converter, and the load has been established,
when the security authentication processor authenticates the security authentication signal, the linkage security authentication based on the hardware by linkage between the controller and the power converter has been established, and
when the program code authentication processor authenticates the program code transmitted from the controller, the linkage security authentication based on the software by linkage between the controller and the power converter has been established.

15. The load control system according to claim 14, wherein the controller is configured to transmit a code generation enable signal to the power converter,
the power converter includes a dedicated function portion to generate the function that enables the power converter to be used for the predetermined purpose, and a code authentication portion to check the code generation enable signal transmitted from the controller,
when the code authentication portion authenticates the code generation enable signal, the linkage security authentication based on the hardware by the linkage between the controller and the power converter has been established, and when the linkage security authentication based on the hardware and the software by the linkage between the controller and the power converter has been established, the controller and the dedicated function portion are connected each other to output a signal from the dedicated function portion to an outside of the power converter.

* * * * *